Dec. 14, 1943.  B. M. BODDE  2,336,978

PROJECTOR

Filed Aug. 3, 1940

Inventor
BERNARD M. BODDE
W A Beatty
Attorney

Patented Dec. 14, 1943

2,336,978

UNITED STATES PATENT OFFICE 2,336,978

PROJECTOR

Bernard M. Bodde, Hollywood, Calif., assignor to Movie Screen Advertising Company of Hollywood, Hollywood, Calif., a corporation of Delaware Application August 3, 1940, Serial No. 350,259

1 Claim. (Cl. 88—23)

The invention relates to a projector and particularly to a projector for projecting pictures from photographic slides or plates.

It has heretofore been proposed to mount a plurality of slide carriers on an endless belt, and move the belt step by step in order to bring each slide into projecting position, one at a time.

An object of the invention is to simplify and improve the driving mechanism for the slides.

For further details of the invention, reference may be made to the drawing wherein Fig. 1 is a front elevation, with parts broken away, of a slide projector according to the present invention.

Figure 1:
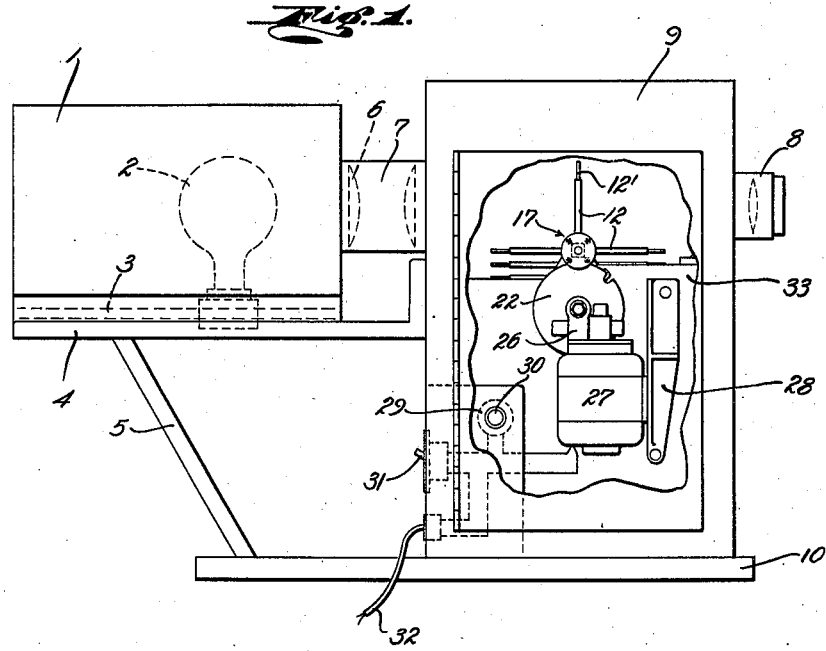

Referring to the drawing, the lamp house 1 contains a projection lamp 2 supported on rods 3. The lamp house 1 is carried by a shelf or support 4 supported by a brace 5 above the base 10 on which the projector casing 9 is mounted. Lamp 2 is provided with one or more condenser lenses 6 in a housing 7 to project a beam of light on a slide 12'. The slide 12' is a photographic slide—that is, it has a picture in black and white or color. The illuminated picture on the slide 12' is focused onto a screen not shown, by means of an objective lens 8.

Figure 3:
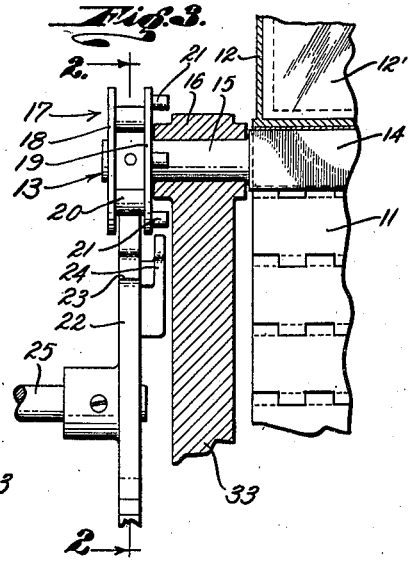
Fig. 3 is a section on line 3—3 of Fig. 2.

The projecting slides 12' are held in slide carriers such as 12. The slide carriers 12 are mounted in spaced relation on an endless belt 11 having hinged sections as shown in Fig. 3 as well known in the art. The belt 11 is traversed one hinge section at a time by means of the shaft 13 having a square section 14, each side of the square being of substantially the same width as one of the sections of the belt, 11. The shaft 13 is round at its outer end as shown at 15 where it is supported by a bearing 16 in the framework 33. Outside of the bearing 16 and on the round shaft portion 15 is arranged a spool 17 which forms one element of a Geneva movement. Spool 17 has spaced flanges 18 and 19 between which are arranged four spaced rollers 20, which are in vertical alignment with the periphery of the disc 22. Projecting inwardly from flange 19 are four projections 21 which are interspaced with the rollers 20. Disc 22 is provided with a notch 23 into which one of the rollers 20 is adapted to enter when the spool 17 is rotated one step through the arm 24 acting on one of the projections 21.

Figure 2:
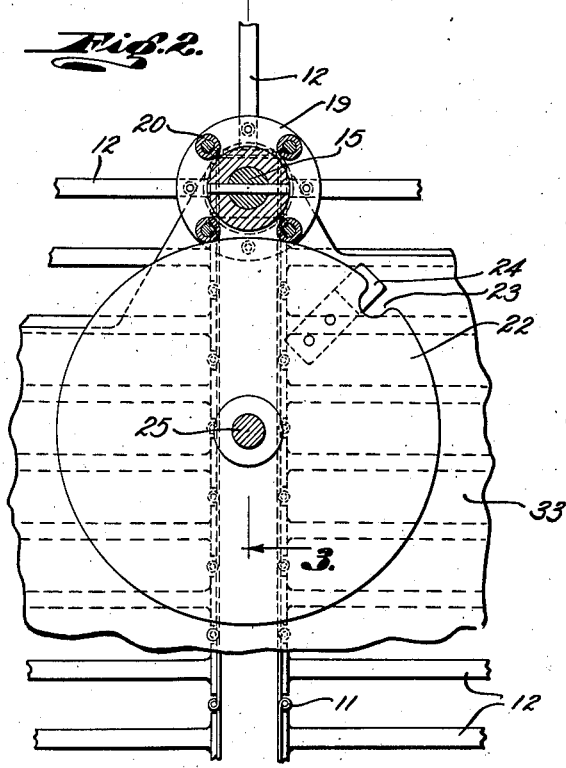
Fig. 2 is an enlarged front elevation of the stepping mechanism, the section being taken on line 2—2 of Fig. 3.

With the parts as shown in Fig. 2, the periphery of the disc 22 engages two adjacent rollers 20 to lock the slide carrier 12 in vertical position. The slide carrier 12 remains in that vertical position until disc 22 rotates counter-clockwise to rotate shaft 13 one quarter turn and bring the next slide carrier 12 into vertical or projecting position.

As the angle subtended from the center of disc 22 to the notch 23 and arm 24 is very small in proportion to 360°, it will be apparent that the time of change-over from one slide to the next is very small in proportion to the time that each slide remains in projecting position.

Disc 22 is mounted on a slow speed shaft 25 which is connected through suitable reduction gearing 26 to the motor 27. Reduction gearing 26 is mounted on and carried by the motor 27, this type of motor being well known. The speed ratio of the armature of motor 27 to the shaft 25 for example, may be of the order of thirty to one.

Motor 27 is mounted on the support or casting 28 which is suitably secured to the framework 33.

In circuit with motor 27 I provide a rheostat 29 having a control knob 30 which may be operated to vary the speed of the motor and thereby vary the frequency with which the slides 12' are brought into projecting position. Motor 27 may be energized from a suitable power line 32 having a control switch 31, and lamp 2 may be provided with a power line and with a blower not shown.

Endless belt 11 is supported at its lower end not shown, by a suitable shaft as is well known.

From the above description it will be apparent that I have provided a step by step movement 17, 23, 24, which directly couples the driving shaft 25 of the motor 27 to the driven shaft 13 which carries the belt 11 and the slide carriers 12. This direct connection is positive in its action and has numerous advantages over a certain prior arrangement wherein a spring is twisted under tension to effect movement of the slides. Certain of these advantages have been outlined above and another one is that the present apparatus is more compact through arranging the shaft 25 parallel to the shaft 13, with the stepping mechanism 17, 23, 24 connected to these two shafts.

It will be apparent that various modifications may be made in the invention without departing from the spirit of the following claim.

I claim:

A projector comprising a slide carrier shaft terminating in spool having a circular array of spaced rollers and interspaced projections, a slow speed motor shaft terminating in a disc having a notch to receive said rollers in sequence and having a striker arm to engage said projections in sequence to turn said slide carrier shaft, and independent means to support said shafts in parallel relation with said spool in operative relation to said disc and with two adjacent ones of said rollers in engagement with the periphery of said disc while said spool is not rotated by said striker arm, to hold said slide carrier stationary at such times, said independent means comprising a bearing for said slide carrier shaft, and an independent motor support, a motor mounted on said motor support, and means supporting said slow speed motor shaft on and coupled to said motor.

BERNARD M. BODDE.